United States Patent [19]

Schuss

[11] Patent Number: 4,635,184
[45] Date of Patent: Jan. 6, 1987

[54] DISTRIBUTED CONTROL WITH MUTUAL SPARE SWITCH OVER CAPABILITY

[75] Inventor: Jack A. Schuss, West Hartford, Conn.

[73] Assignee: Combustion Engineering, Inc., Windsor, Conn.

[21] Appl. No.: 682,382

[22] Filed: Dec. 17, 1984

[51] Int. Cl.$^4$ .................. G06F 15/46; G06F 11/00
[52] U.S. Cl. .................. 364/187; 364/131; 371/9
[58] Field of Search .................. 364/184–187, 364/131–134; 371/8, 9, 11

[56] References Cited

U.S. PATENT DOCUMENTS

| | | | |
|---|---|---|---|
| 4,123,794 | 10/1978 | Matsumoto | 364/187 X |
| 4,133,027 | 1/1979 | Hogan | 364/187 |
| 4,347,563 | 8/1982 | Paredes et al. | 371/9 X |
| 4,500,951 | 2/1985 | Sugimoto et al. | 371/9 X |
| 4,542,479 | 9/1985 | Kamimura et al. | 364/187 X |
| 4,542,506 | 9/1985 | Oe et al. | 364/187 X |
| 4,581,701 | 4/1986 | Hess et al. | 364/187 |

Primary Examiner—Joseph Ruggiero
Attorney, Agent, or Firm—David L. Smith

[57] ABSTRACT

A distributed control system controlling a plurality of energize-to-start, energize-to-stop subprocesses is designed for on-line maintenance. One or more of the process control computers (86) forming the distributed control system (86–100) can be removed from service and the input and output connections (130) thereto switched to another of the process control computers that remains on-line. A bumpless transfer of control is achieved by reconstructing the status of the latches in the process control computer (86) removed from service that are history dependent and establishing that status in the latches of control circuits of the process control computer (96) assuming control. The status that the history dependent latches should have is derived based upon the operating status of the subprocess at the time switching is complete. Control functions dependent on the status of a latch are delayed until the reconstructed status of latches are complete.

4 Claims, 11 Drawing Figures

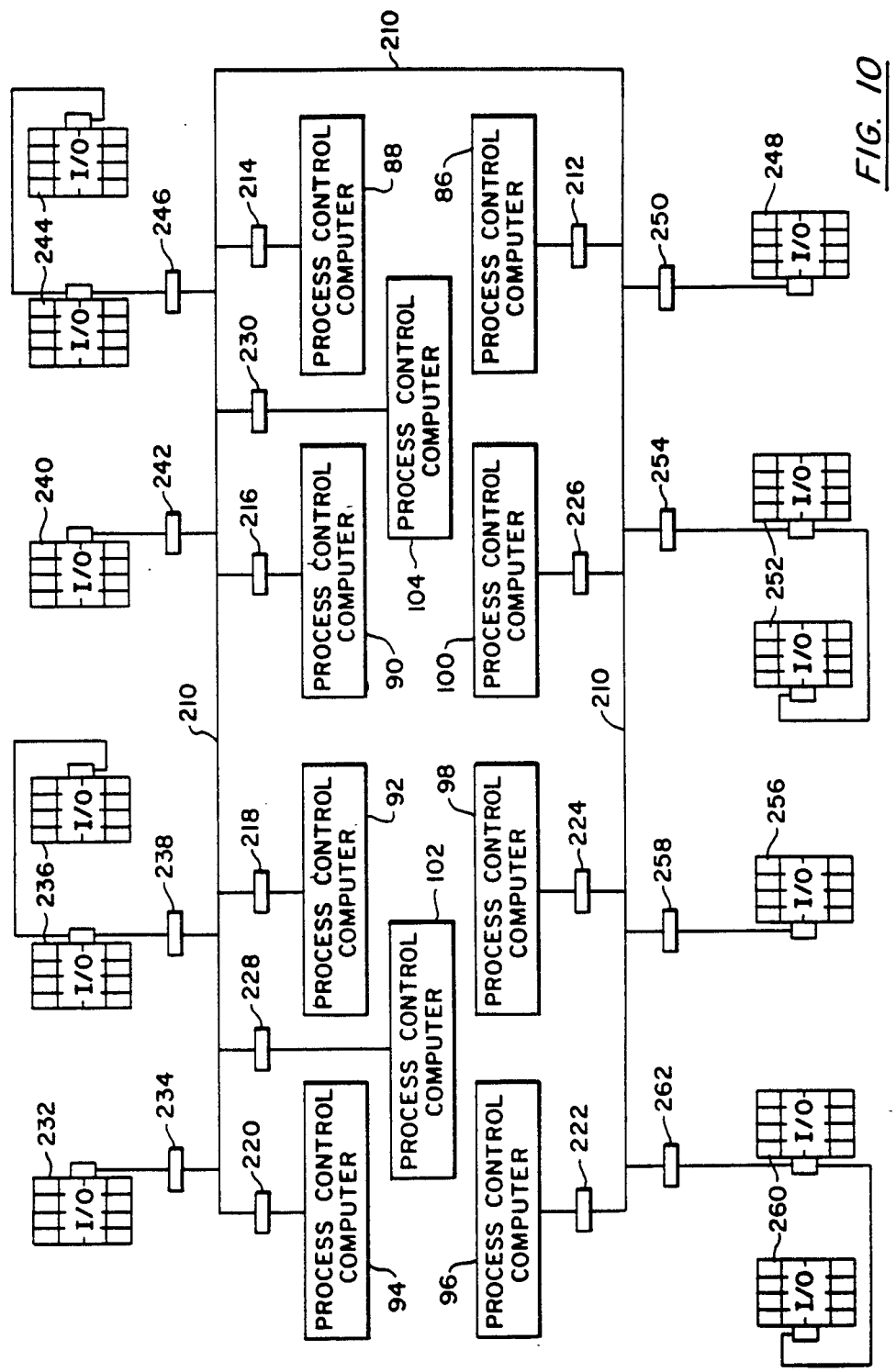

DISTRIBUTED CONTROL WITH MUTUAL SPARE SWITCH OVER CAPABILITY

BACKGROUND OF THE INVENTION

This invention relates to a method of controlling a plurality of subprocesses in a distributed control system upon the failure or otherwise removal from service of a process control computer controlling one of the subprocesses and more particularly to a method of providing a bumpless transfer of control from a process control computer that has failed or is otherwise removed from service to a process control computer acquiring control of a subprocess not previously controlled by that process control computer.

In a ring-type distributed control system such as disclosed in U.S. Pat. No. 4,015,548 each process control computer controls the associated subprocess, specifically a coal pulverizer and elevation of fuel firing equipment. The same process control computer monitors the operation of the associated coal pulverizer and burner elevation equipment from a safety perspective. An adjacent process control computer also monitors the operation of a coal pulverizer and burner elevation from a safety perspective. Field inputs necessary to ascertain the status of safety equipment are wired to input ports of both the controlling process control computer and the process control computer providing redundant safety backup.

The process control computer providing redundant safety backup has the ability to shutdown the coal pulverizer and burner elevation equipment that it is monitoring from a safety perspective. In an energize-to-start, energize-to-stop control system, a failure or otherwise removal from service of the processor providing control of its associated coal pulverizer and burner elevation does not remove the associated coal pulverizer and burner elevation from service. The associated coal pulverizer and burner elevation remain in service until an unsafe operating condition is approached at which time the adjacent processor monitoring the coal pulverizer and burner elevation from a safety perspective will safely shutdown the coal pulverizer and burner elevation. However, the processor providing redundant safety backup does not have the ability to control the coal pulverizer and burner elevation but rather only permits the coal pulverizer and burner elevation to remain in service at the status quo.

What is needed is a method of controlling a plurality of subprocesses in a distributed control system upon the failure or otherwise removal from service of a process control computer controlling one of the subprocesses by providing a bumpless transfer of control without continually providing an update of the control variables to the process control computer that will assume control.

SUMMARY OF THE INVENTION

The present invention provides a method of controlling a plurality of subprocesses in a distributed control system upon the failure or otherwise removal from service of a digital process control computer controlling one of the subprocesses by providing a bumpless transfer of control to a process control computer that has not failed or otherwise been removed from service. Each of the process control computers in the distributed control system is monitored to detect the failure or removal from service of any process control computer. Upon detecting the failure or removal from service of a process control computer, the input and output connections from the process controlled computer removed from service are switched to another process control computer of the distributed control system that is not failed or otherwise been removed from service and is preprogrammed to control a second subprocess. Prior to controlling the subprocess, the process control computer assuming control determines the status of the process of which it is assuming control and delays performing any control function dependent upon the state of a memory device until the inputs to the memory device can be updated, typically two scan times. In this manner a bumpless transfer of control is achieved from a process control computer that has failed or is otherwise removed from service to another process control computer of the distributed control system that remains on-line.

BRIEF DESCRIPTION OF THE DRAWING

FIG. 10 is a diagrammatic representation of a distributed control system including a data highway in which an alternate embodiment of the invention may be employed.

DESCRIPTION OF THE PREFERRED EMBODIMENT

Figure 2:
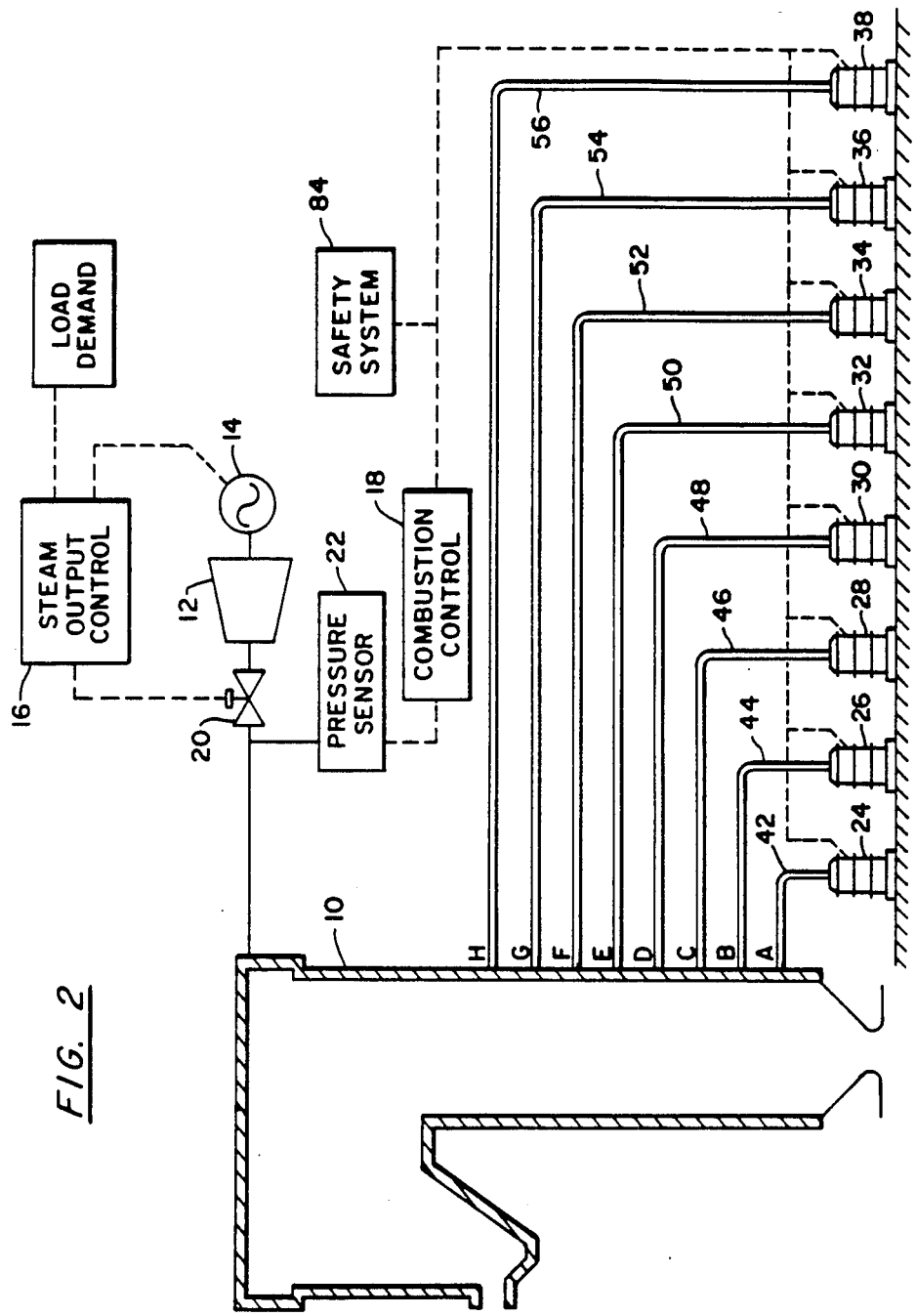
FIG. 2 is a diagrammatic representation of a power plant in which the present invention may be employed.

Referring to the drawing, initially to FIG. 2, furnace 10 is shown supplying steam to steam turbine 12 which in turn drives electric generator 14. A steam output control system 16 and combustion control system 18 are utilized to control the steam flow from furnace 10 in response to changing load demands on electric generator 14. Steam flow from furnace 10 is delivered to steam turbine 12 by vapor regulating valve 20 which in turn is controlled by steam output control system 16. The pressure in the steam supply line between furnace 10 and steam turbine 12 upstream of regulating valve 20 is sensed by pressure sensor 22 and the sensed pressure is delivered as a control input to combustion control system 18. Combustion control system 18 controls the flow of fluid to furnace 10 and also modulates the fuel input by controlling a plurality of pulverizing coal mills 24, 26, 28, 30, 32, 34, 36 and 38 to meet the load demand requirements of steam turbine 12.

Figure 4:
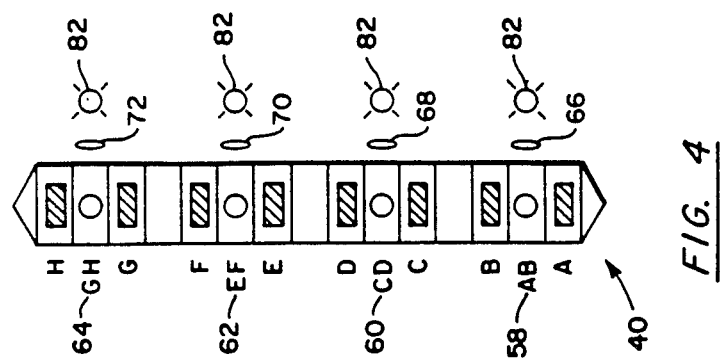
FIG. 4 is a schematic representation of a typical firing corner of the furnace depicted in FIG. 2.

The pulverizing coal mills supply the pulverized coal to burner assemblies (not shown) typically arranged in elevations. Each elevation may include ignitors and burners disposed in each of the four corners of furnace 10 and adapted for tangential firing. A typical corner 40 containing eight elevations of burners is shown in FIG. 4. Pulverizing coal mill 24 supplies a coal-air mixture to the burners of elevation A through coal supply line 42. Similarly, pulverizing coal mill 26 supplies a coal-air mixture to the burners of elevation B through supply line 44; pulverizing coal mill 28 supplies a coal-air mixture to the burners of elevation C through coal supply line 46; pulverizing coal mill 30 supplies a coal-air mixture to the burners of elevation D through coal supply line 48; pulverizing coal mill 32 supplies a coal-air mixture to the burners of elevation E through coal supply line 50, pulverizing coal mill 34 supplies a coal-air mixture to the burners of elevation F through coal supply line 52; pulverizing coal mill 36 supplies a coal-air mixture to the burners of elevation G through coal supply line 54; and pulverizing coal mill 38 supplies a coal-air mixture to the burners of elevation H through coal supply line 56.

Corner 40 also includes an elevation of oil fired burners 58 between coal elevations A and B, an elevation of oil fired burners 60 between coal elevations C and D, an elevation of oil fired burners 62 between coal elevations E and F and an elevation of oil fired burners 64 between coal elevations G and H. The oil fired burners 58, 60, 62 and 64 are utilized to warm-up the furnace prior to start-up of pulverizers 24-38, during low load operations to stabilize the fireball and to supplement or in place of coal as a fuel.

Each of the elevations of oil are typically ignited with a pilot ignitor to ignite oil entering the furnace 10 through the associated burner elevation. Pilot ignitor 66 is associated with oil elevation 58, pilot ignitor 68 is associated with oil elevation 60, pilot ignitor 70 is associated with oil elevation 62, pilot ignitor 72 is associated with oil elevation 64.

As shown in FIG. 4, flame scanners 82 are disposed at appropriate positions to detect the presence or absence of flame. The flame scanners provide important safety control information which is utilized by the process control computers indicated generally as safety system 84.

Figure 3:
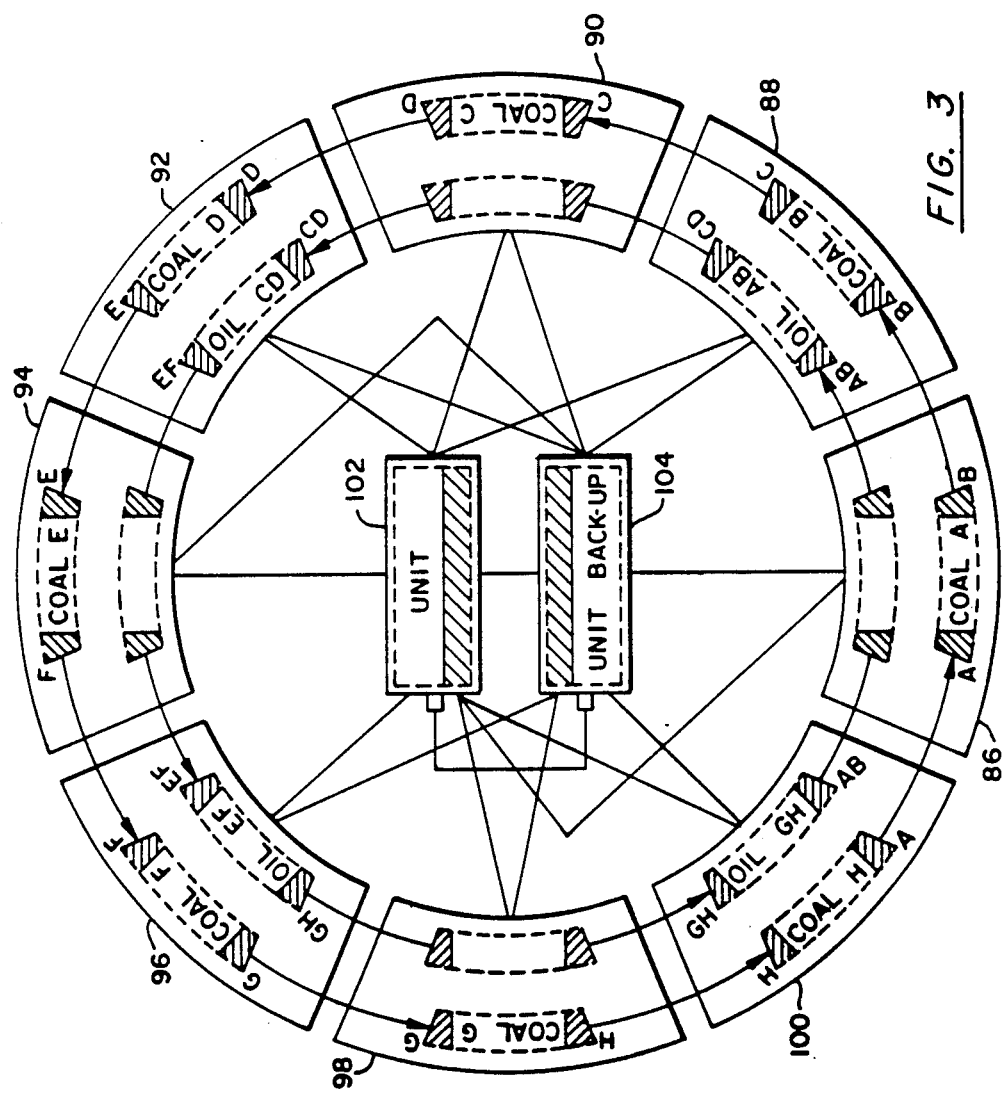
FIG. 3 is a diagrammatic representation of a distributed control system.

The coal supply system is disclosed in U.S. Pat. No. 3,395,657. The "ring"-type distributed control system controlling inter alia the coal supply system is disclosed in U.S. Pat. No. 4,015,548, which is hereby incorporated by reference. FIG. 3 shows a ring-type distributed control system as disclosed in FIG. 2 of the latter U.S. Patent. As shown in FIG. 3, the ring-type distributed control system is comprised of ten process control computers 86-104. In the preferred embodiment, the number of process control computers in the distributed portion of the control system corresponds one-to-one in number to the number of subprocesses controlled. The correspondence ratio may vary, for example, two or more subprocesses may be controlled by a single process control computer.

By way of example as typical of process control computers 86, 88, 90, 92, 94, 96, 98 and 100, process control computer 86 controls pulverizing coal mill 24 and burner elevation A associated therewith from a first portion of the memory of process control computer 86. A second portion of the memory of process control computer 86 is reserved to monitor the operation of pulverizing coal mill 24 and burner elevation A from a safety perspective. A third portion of the memory of process control computer 86 is reserved to monitor from a safety perspective the operation of pulverizing coal mill 26 and burner elevation B which is controlled by process control computer 88, thereby serving as a redundant backup of the operational safety of the pulverizing coal mill and associated burner controlled by the counterclockwise neighbor process control computer in the distributed portion of the ring-type control system as shown in FIG. 3.

Each process control computer 86-100 of the distributed control system has a preprogrammed set of instructions so that it may assume control of the subprocess controlled by another process control computer. Thus, process control computer 86 is preprogrammed to control in addition to pulverizing coal mill 24 and associated burner elevation A the subprocess controlled by any of process control computers 88, 92, 96 or 100. Since the process control function performed by process control computer 88 is virtually identical to the process control function of process control computers 92, 96 and 100, process control computer 86 could assume the control function of any of process control computers 88, 92, 96 or 100 in the preprogrammed, but initially unused logic of process control computer 86. Initially unused denotes that although the logic is preprogrammed and executed during each scan, there are, initially, no inputs and outputs connected thereto.

Figure 5:
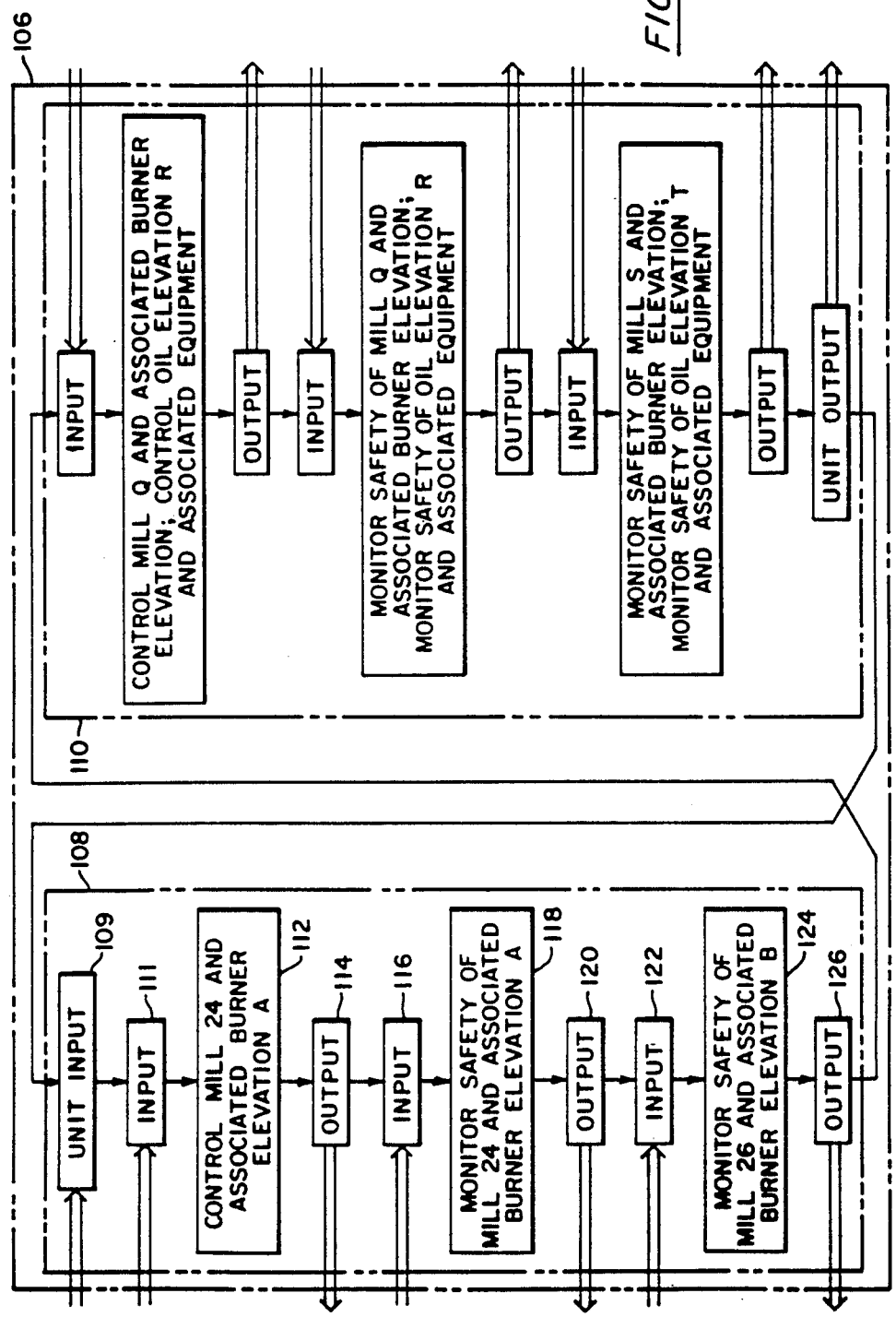
FIG. 5 is a schematic representation of the control function performed by process control computer 86.

Process control computer 86 logic is shown in FIG. 5. Within process control computer logic 106, the processor scans through the logic denoted 108 executing preprogrammed instructions, then through the logic denoted 110 executing preprogrammed instructions to complete a single scan thence back to the logic 108 to repeat executing the preprogrammed set of instructions in a subsequent scan. In process control computers 86, 90, 94 and 98 logic 108 is the active logic with inputs and outputs connected thereto; logic 110 is initially spare logic, preprogrammed generically and capable of assuming control of the field devices controlled by any of process control computers 88, 92, 96 or 100 upon switching the input and output connections thereto. In process control computers 88, 92, 96 or 100, logic 110 is the active logic with inputs and outputs connected thereto; logic 108 is spare logic, preprogrammed generically and capable of assuming control of the field devices controlled by any of process control computers 86, 90, 94 or 98 upon switching the input and output connections thereto.

Within the logic denoted 106 it can be seen that process control computer 86 receives input signals 109 from the unit process control computer 102 which determines unit functions such as which pulverizing coal mills and associated burner elevation equipment is in service. As load demand is decreased, pulverizing coal mills and associated burner elevation equipment are removed from surface.

Process control computer 86 receives as input signals 111 the current status of field devices of pulverizing coal mill 24 and associated burner elevation A being controlled by process control computer 24 and generates in response thereto and in accordance with a preprogrammed set of instructions 112, control signals to control the associated pulverizing coal mill and elevation of burners. The input signals 111 received by the process control computer 86 includes such signals as pulverizer outlet temperature less than a specified maximum, lube oil level adequate, no pulverizer trip, ignitor valve closed feedback and ignitor valve proven feedback. Process control computer 86 outputs control signals 114 generated in response to the input operational parameters in accordance with a preprogrammed set of instructions. The output control signals may include energize ignitor spark command, open ignitor valve command, cold air gate open, feeder inlet gate open, ignitor trip command and feeder start command.

Process control computer 86 monitors the operational safety of pulverizing coal mill 24 and associated burner elevation A by receiving input signals 116 of operational parameters of pulverizing coal mill 24 in associated burner elevation, generating in response to the input operational parameters 116 in accordance with a preprogrammed set of instructions 118 control signals outputted through 120 to permit pulverizing coal mill 24 in associated burner elevation A to continue operation in the status quo or to shutdown if required.

Process control computer 86 also monitors the operational safety of a pulverizing coal mill and burner elevation controlled by another process control computer. Process control computer 86 serves as a redundant backup of the operational safety of pulverizing coal mill 26 and burner elevation B controlled by process controlled computer 88. Process control computer 86 receives as input signals 122 such operational parameters as pulverizer outlet temperature less than a specified maximum and pulverizer motor power relating to pulverizing coal mill 26 in burner elevation B, executes a preprogrammed set of instructions 124 and generates control signals outputted through 126 as redundant backup of the operational safety of pulverizing coal mill 26 and burner elevation B to permit pulverizing coal mill 26 and associated burner elevation B to continue operation in the status quo or to shutdown when the monitored operational parameters exceed a safe operating condition. Thus, each process control computer 86-100 monitors the operational parameters of a second pulverizing coal mill as a redundant backup of another of the process control computers, the second pulverizing coal mill being controlled by a process control computer other than the process control computer providing the redundant backup. As a redundant backup process control computer monitoring the operational safety of a second pulverizing coal mill, the process control computer monitors the same operational parameters of the second pulverizing coal mill as it monitors of the pulverizing coal mill that it controls. Thus, if process control computer 88 controlling pulverizing coal mill 44 should fail or otherwise be removed from service, process control computer 86 can safely shutdown pulverizing coal mill 26 and burner elevation B.

The logic denoted 110 in FIG. 5 is preprogrammed generically but initially unused in process control computer 86. Prior to switching the input and output connections from another process control computer removed from service to process control computer 86 there are no input or output connections to logic 110, however, it is executed each scan. Thus prior to switching logic 110 performs no control or safety function within process control computer 86. It is this logic that assumes control of field devices controlled by another of process control computers 88, 92, 96 or 100 upon removal from service and switching of the input and output connections from the process control computer removed from service to predetermined spare input and output ports on process control computer 86.

As stated above, in process control computers 88, 92, 96 and 100, logic 110 is the active logic with inputs and outputs connected thereto; logic 108 is spare logic, preprogrammed generically and capable of assuming control of the field devices controlled by any of process control computers 86, 90, 94, or 98 upon switching the input and output connections. Logic 110 controls a pulverizing coal mill and associated burner elevation, monitors the controlled pulverizing coal mill and associated burner elevation from a safety perspective and monitors a pulverizing coal mill and associated burner elevation from a safety perspective. Furthermore, logic 110 controls an oil elevation, monitors the oil elevation equipment from a safety perspective and monitors an oil elevation controlled by another process control computer from a safety perspective.

Figure 6:
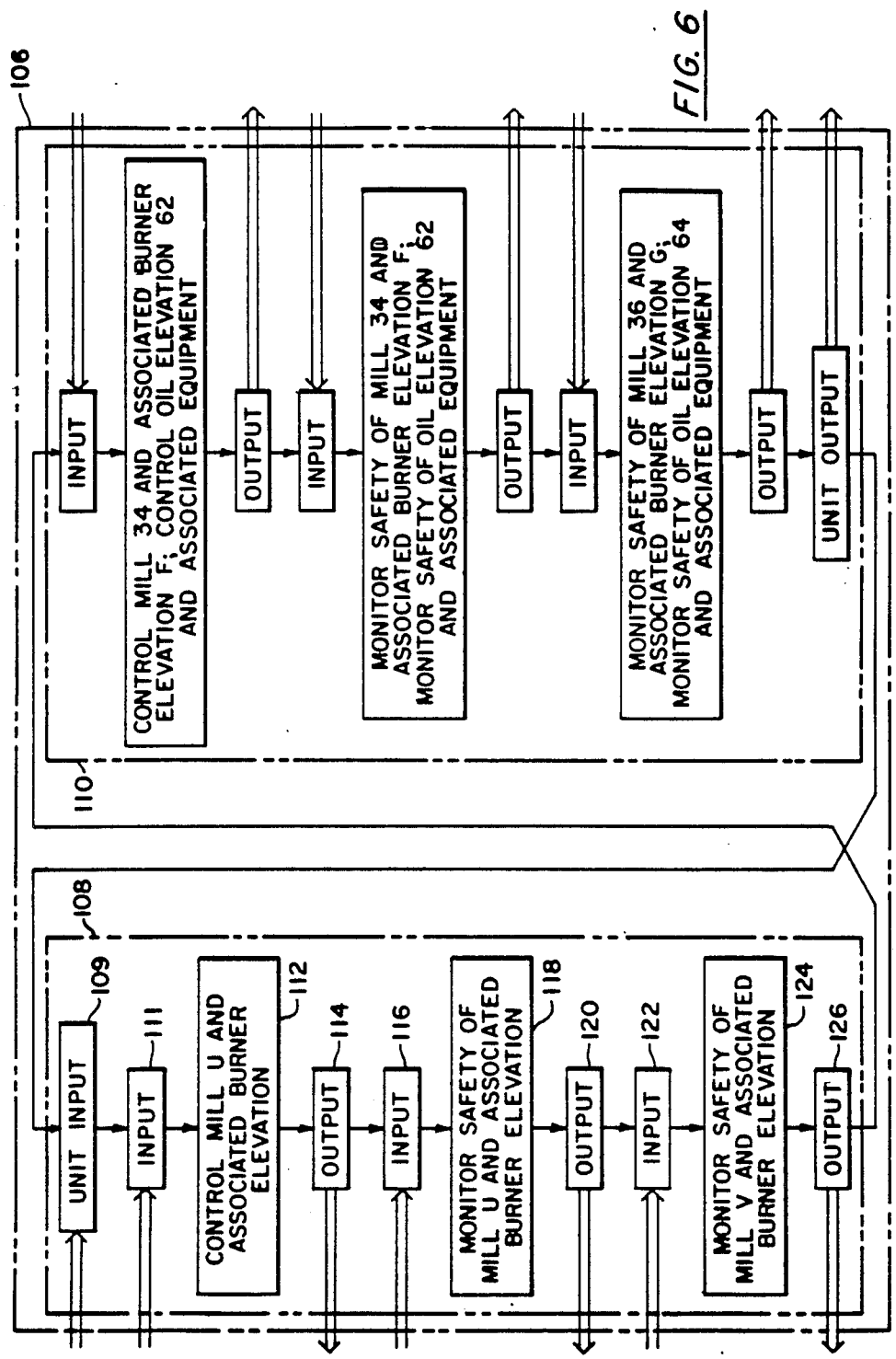
FIG. 6 is a schematic representation of the control function performed by process control computer 100.

The logic of process control computer 96 as shown in FIG. 6 is typical of the logic of process control computers 88, 92, 96 and 100. Process control computer 96 controls pulverizing coal mill 34 and associated burner elevation F, monitors pulverizing coal mill 34 and burner elevation F from a safety perspective, monitors pulverizing coal mill 36 and burner elevation G from a safety perspective as a redundant backup to process control computer 98, controls oil elevation 62 and associated equipment, monitors oil elevation 62 and associated equipment from a safety perspective, and monitors oil elevation 64 and associated equipment from a safety perspective as a redundant backup to process control computer 100.

Process control computer 102 provides the unit function. Process control computer 104 is a backup process control computer for process control computer 102. Process control computer 102 monitors the operational status of pulverizing coal mills 24–38 receiving input signals through input image registers of the operational status of the pulverizing mills such as whether each pulverizing mill is in operation and the loading thereon as well as operational parameters concerning furnace 10 and the load demand on steam turbine 12 such as drum level, negative furnace pressure high, flame failure trip, low air flow, turbine trip, loss of fuel, induced draft fan off, forced draft fans off, cooling water flow adequate, start circulating pump command, stop circulating pump command, discharge valves open and no master fuel trip. Process control computer 102 generates in response to the operational status of pulverizing coal mills 24–38, the operational status of furnace 10 and the load demand on steam turbine 12 and in accordance with a preprogrammed set of instructions controls signals outputted through output image registers of process control computer 102 which are unit input control signals to process control computers 86-100 for varying the loading of each of the pulverizing coal mills to the extent that it places pulverizing coal mills and the corresponding elevation of burners in and out of service as a function of power plant load. Process control computer 102 also generates in response to the operational status of furnace 10 and in accordance with a preprogrammed set of instructions shutdown signals outputted through output image registers of process control computer 102 to shutdown furnace 10 when an unsafe operating condition is approached.

Figure 1:
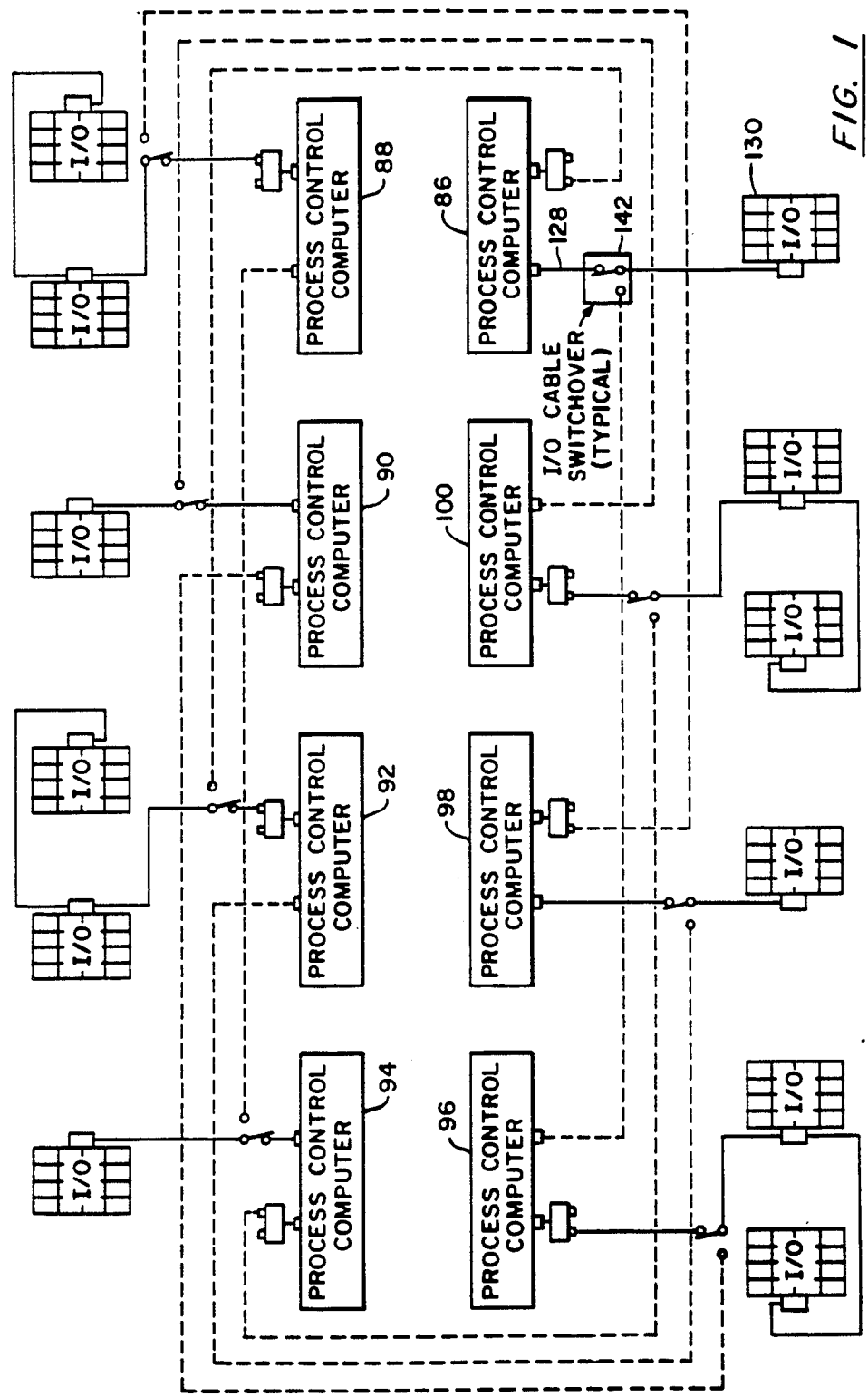
FIG. 1 is a schematic representation of the input/output switching in accordance with the present invention.

FIG. 1 schematically discloses the switching of the inputs and outputs from a failed or otherwise removed from service process control computer to another process control computer of the distributed control system that has not failed or been removed from service. In the preferred embodiment, the process of determining which process control computer assumes control is by a cascade sequence select circuit such as the typical circuit shown in FIG. 9.

When the process control computer 86 diagnostics indicate that process control computer 86 has failed or is otherwise removed from service and the diagnostics confirms the shutdown condition, the output of AND gate 200 goes high indicating that it is proper to switch the input and output connections from process control computer 86 to another process control computer. As determined by the cascade sequence select circuit, the sequence select circuit attempts to switch the inputs and outputs to any of the other available process control computers with the lowest priority given to those process control computers adjacent the process control computer 86. Hence, the inputs and outputs of a failed or otherwise removed from service process control computer 86 are switched to process control computers 100 or 88 only if no other process control computer is available to assume control. Thus, when the output of AND gate 200 indicates that it is proper to switch the inputs and outputs from process control computer 86 and no other process control computer has switched to process control computer 96 and process control computer 96 is proven operational, the output of AND gate 202 goes high resulting in the inputs and outputs from process control computer 86 being switched to process control computer 96.

If the output of AND gate 200 is high and either another process control computer has switched inputs and outputs to process control computer 96 or process control computer 96 is not proven operational, the need to switch inputs and outputs from process control computer 86 remains, process control computer 96 is not available the output of AND gate 204 goes high and the attempt to switch the inputs and outputs from process control computer 86 cascades to the next subsequent process control computer in a predetermined sequence.

When the output of AND gate 204 is high and no other process control computer has switched inputs and outputs to process control computer 92 and process control computer 92 is proven operational, the output of AND gate 206 goes high and the inputs and outputs of process control computer 86 are switched to process control computer 92. Should process control computer 92 not be available to assume control because either another process control computer had previously switched to process control computer 92 or because process control computer 92 was not proven operational, switching the inputs and outputs from process control computer 86 to process control computer 92 is not successful, the output of AND gate 208 goes high and the attempt to switch inputs and outputs from process control computer 86 to another process control computer cascades to the next subsequent process control computer in the predetermined sequence.

As previously stated, this cascading sequence is continued through all available process control computers that can assume the control function of the process control computer that has failed or is otherwise removed from service with the last two process control computers in the sequence being those adjacent the failed or otherwise removed from service process control computer. For example, the process control computers adjacent process control computer 86 in the ring configuration shown in FIGS. 1 and 3 are process control computer 100 and process control computer 88. These process control computers are last in the cascade sequence because switching to those process control computers removes a desirable redundant safety function. For example, when the output of AND gate 208 is high and no other process control computer has switched inputs and outputs to process control computer 100 and process control computer 100 is proven operational, the inputs and outputs from process control computer 86 are switched to process control computer 100 as the output of AND gate 210 goes high. The redundant monitoring, by two independent process control computers, of the safety of pulverizing coal mill 24 and associated burner elevation A is eliminated as the redundant monitoring provided by process control computer 100 as initially established in the distributed ring control system and the safety monitoring of pulverizing coal mill 24 and associated burner elevation A formerly provided by process control computer 86 and now residing in logic 110 of process control computer 100 are both provided by a single process control computer, namely process control computer 100.

Similarly, when the output of AND gate 208 is high and either another process control computer has switched inputs and outputs to process control computer 100 or process control computer 100 is not proven operational, the output of AND gate 212 goes high attempting to switch the inputs and outputs from process control computer 86 to process control computer 88. This switching is successful when no other process control computer has switched inputs and outputs to process control computer 88 and process control computer 88 is proven operational. In switching the inputs and outputs from process control computer 86 to process control computer 88 the redundancy provided by two process control computers of monitoring the safety of pulverizing coal mill 26 and associated burner elevation B is lost as both reside in process control computer 88.

FIG. 1 schematically discloses the switching of inputs and outputs from each process control computer 86–100 in the ring portion of the distributed control system to another process control computer of the distributed control system that has not failed or otherwise been removed from service. Only a single schematic switching is shown for each of the process control computers in FIG. 3 with subsequent process control computers being selected by a cascading sequence circuit as shown in FIGS. 9a and 9b.

Figure 9A:
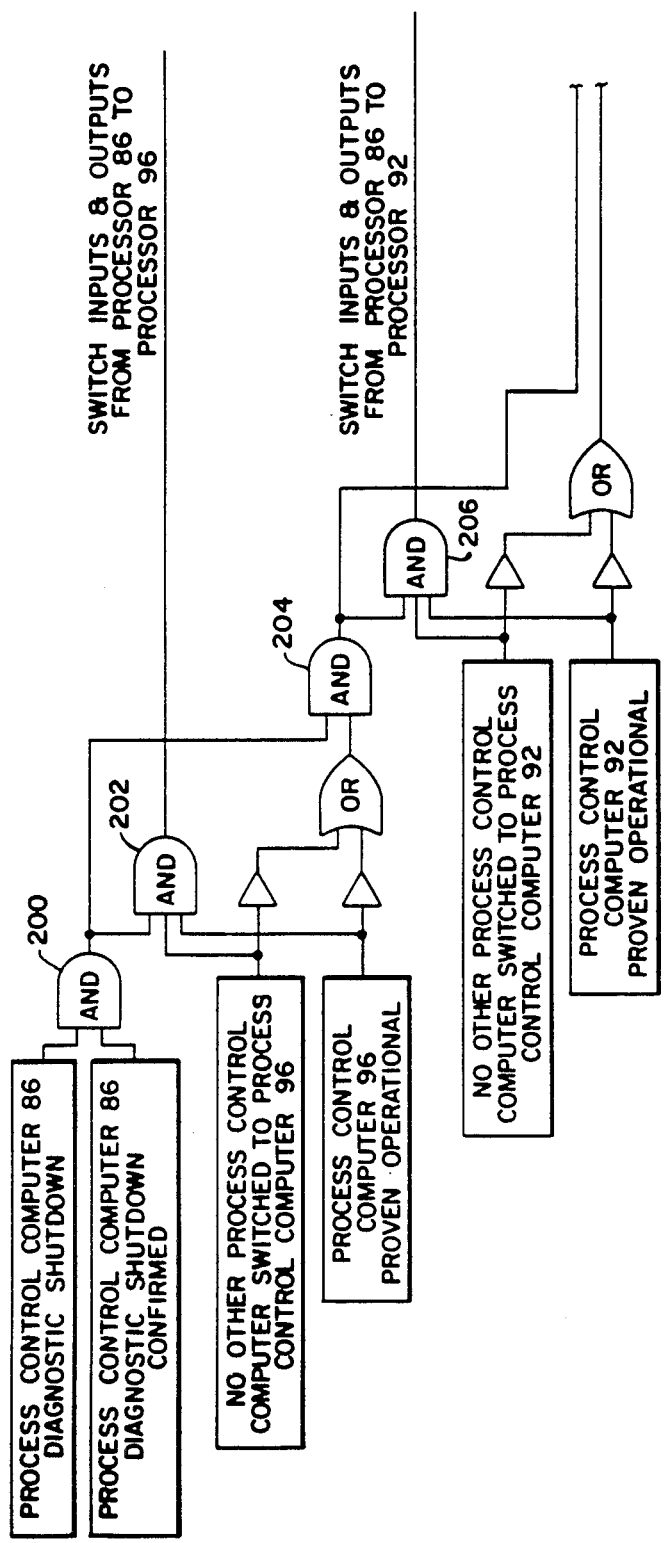
FIGS. 9a and 9b are each portions of a schematic diagram showing a typical cascade sequence of selecting the process control computer to which control is switched.
Figure 9B:
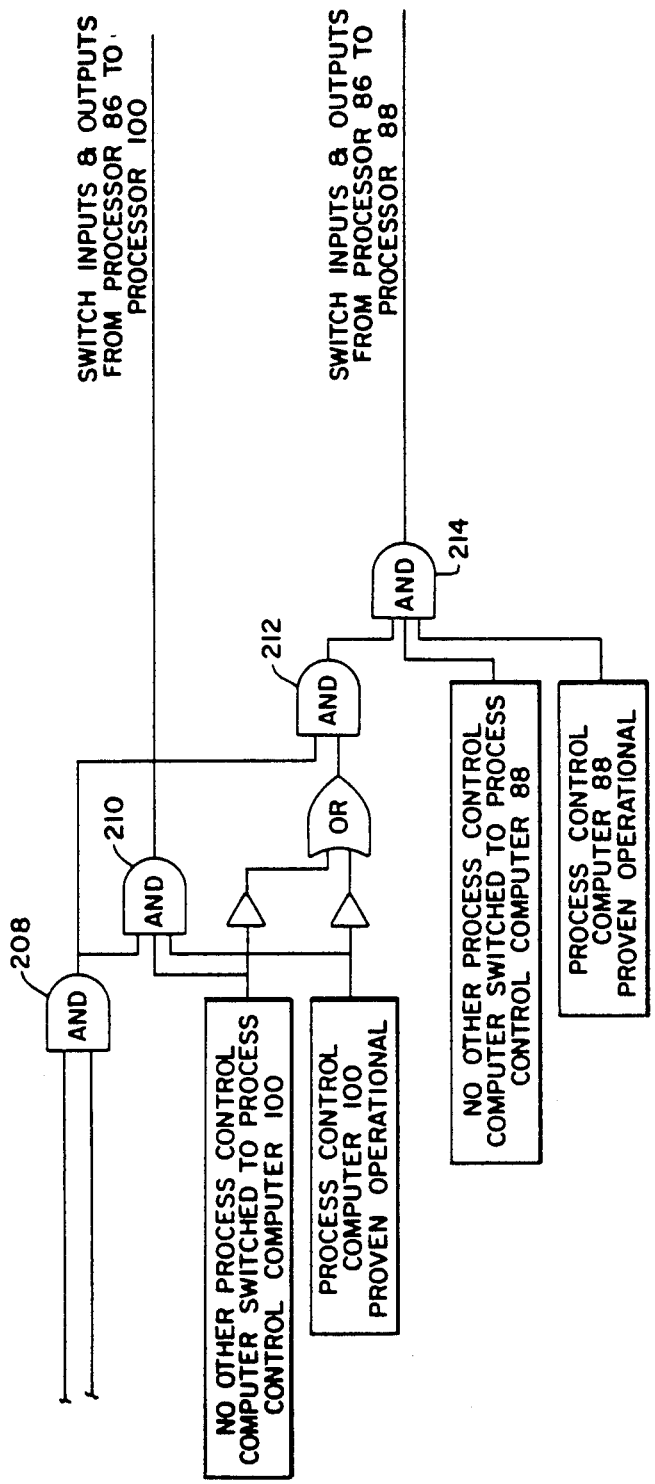

Tying FIGS. 9a and 9b and FIG. 3 together by way of example, when the output of AND gates 200 and 202 are high, the inputs and outputs from process control computer 86 should be switched to process control computer 96. The input and output connections, collectively 128 would be switched to process control computer 96. Input and output connections 128 may consist of a twisted pair of wires or a multiconductor cable. Since each process controlled is an energize-to-start, energize-to-stop process, and since each subprocess is monitored from the safety perspective by a second process control computer which can shutdown the process when an unsafe operating condition is approached, it is not necessary to immediately switch input and output connections 128 from a failed or otherwise removed from service process control computer 86 to process control computer 96 which is in operation controlling associated coal pulverizer 92 and burner elevation F as well as oil elevation 62. Thus, the input and output connection switch may be accomplished manually by unplugging the input cable to process control computer 86 and plugging the cable into process control computer 96, or by automatic switching using, for example, a relay or electronic switch means 142. As a matter of priority upon failure of process control computer 86, the input and output connections 128 would be switched in accordance with a cascade sequence select circuit as shown in FIGS. 9a and 9b.

With reference to FIG. 6, prior to process control computer 86 failing or otherwise being removed from service, the active portion of the logic of process control computer 96 corresponds to logic 110. Logic 108 is preprogrammed in process control computer 100, however, there are no inputs or outputs connected to logic 108. Thus, the preprogrammed instructions within logic 108 are executed each scan but no inputs are received and no outputs are effected. On failure of process control computer 86 and subsequently the switching of input and output connections 128 to process control computer 96, the input and output converters 130 formerly connected to process control computer 86 are connected to logic 108 of process control computer 96 and thereby provide input signals to logic 108 as well as field devices to be driven by the outputs of logic 108.

In transferring control of pulverizing coal mill 24 and associated burner elevation A from process control computer 86 to process control computer 96, the status of any retentative memory device such as a latch or flip flop that retains historical information must be reestablished in the process control computer assuming control of the subprocess prior to any control action dependent upon the status of a latch or flip flop being taken to achieve a bumpless transfer.

Figure 8:
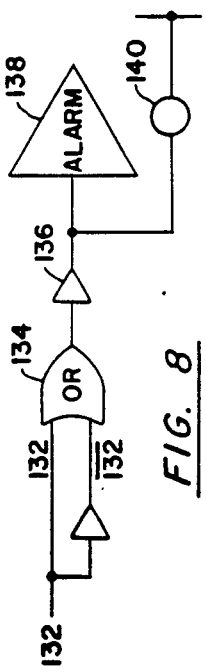
FIG. 8 is a schematic diagram disclosing detecting failure of a process control computer.

Failure or removal from service of process control computer 86 is detected as shown in FIG. 8. A single input 132 and its logical inversion $\overline{132}$ are the inputs to OR gate 134. The output of OR gate 134 should always be a logic 1 when process control computer 86 is energized and has not failed. Upon removal from service or failure of process control computer 86 the output of OR gate 134 becomes a logic zero which when inverted in inverter 136 becomes a logic 1 which energizes alarm 138 to inform a plant operator of the failure of process control computer 86. Simultaneously, for automatic switching relay 140 is energized thereby activating switch means 142 to switch the inputs and outputs 130 from process control computer 86 to process control computer 96 to initiate sequence selection by processor 102 in accordance with the logic of FIGS. 9a and 9b.

Since process control computer 96 is not continually updated as to the operational status of the subprocesses that process control computer 96 may be required to assume control over, subsequent to connecting the inputs and outputs from a failed process control computer to process control computer 96, process control computer 96 must reconstruct any historical information retained in latches or other memory devices based on the operating status of the subprocess at the time the inputs and outputs are switched to the process control computer assuming control and delay performing any control function dependent upon the status of a latch or other memory device until the historical status of such memory devices can be established. Typically, the minimum delay required is two scan times which is approximately 60 milliseconds. This assures that all inputs are evaluated before any control action is taken by an output.

Figure 7:
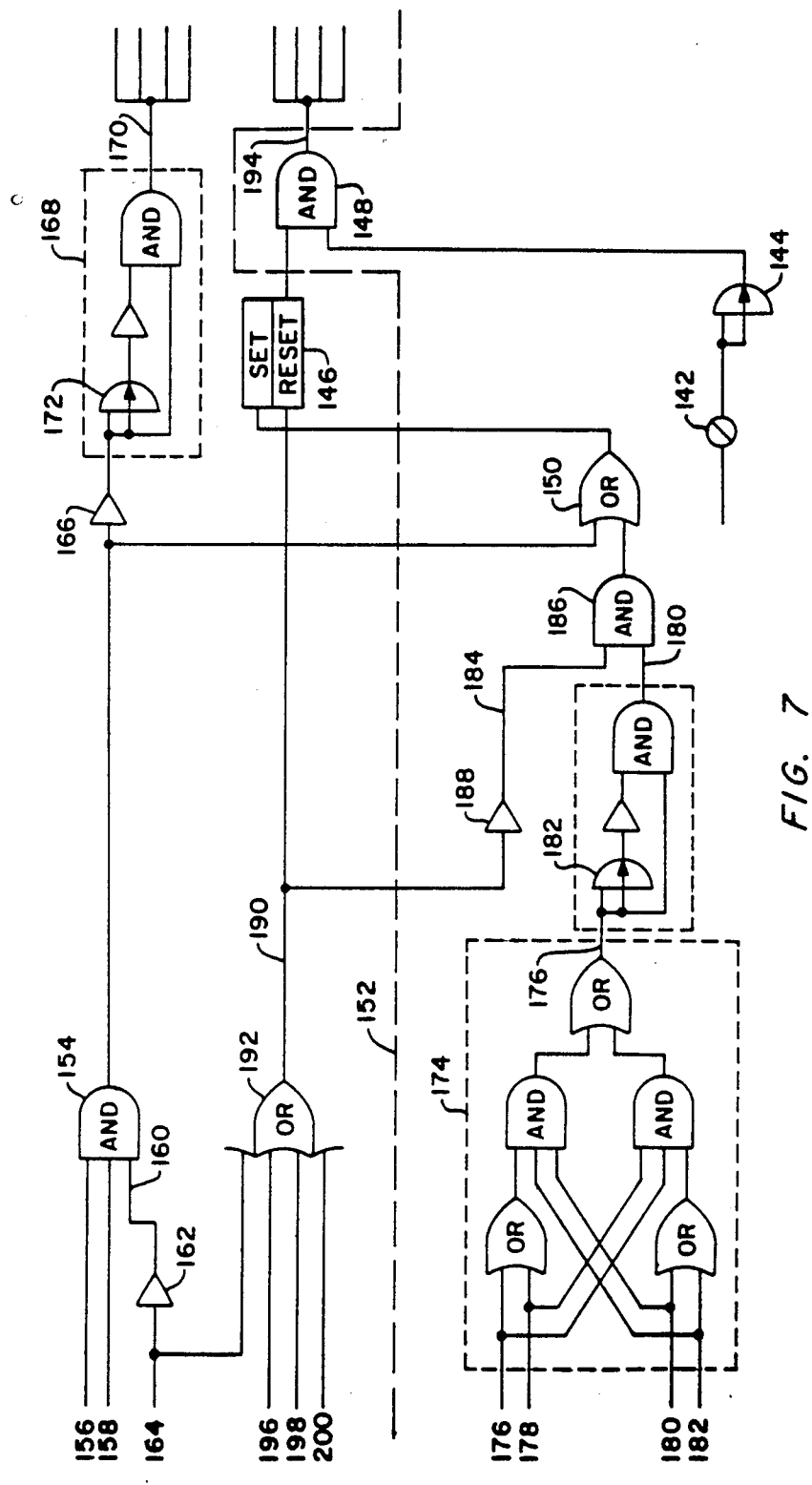
FIG. 7 is a logic diagram showing the implementation of the bumpless transfer of control within the process control computer assuming control.

One such reconstruction is shown in FIG. 7. Upon switching the input and output connections 130 from failed process control computer 86 to process control computer 96 assuming control over pulverizing coal mill 24 and burner elevation A, input converter 142 detects that the input and output connections have been successfully switched thereby providing a logic 1 input to time delay 144. Time delay 144 provides a sufficient time delay to reconstruct the status of latches in control circuits of process control computer 96 based on the operating status of pulverizing coal mill 24 and burner elevation A at the time switching is complete. The minimum time set on time delay 144 would be two scan times of process control computer 96 to permit all inputs and outputs to be evaluated. The duration of time delay 144 shown in FIG. 6 is greater than the minimum. Upon expiration of the time set on time delay 144 the output of time delay 144 becomes a logic 1 thus permitting the output of flip flop 146 to pass through AND gate 148. From the time the input and output connections 128 connect inputs and outputs 130 to process control computer 96 until time delay 144 times out the output of AND gate 148 is a logic 0.

Either of two signals can set flip flop 146. These two signals are represented as the inputs to OR gate 150. The logic above broken line 152 represents logic in the ordinary course of control of pulverizing coal mill 24 and burner elevation A. The logic below broken line 152 represents the additional logic necessary to achieve a bumpless transfer of control from process control computer 86 to process control computer 100. The conventional means of setting flip flop 146 is by generating a logic 1 at the output of AND gate 154. The inputs to AND gate 154 are all ignitor valves closed or any ignitor proven 156, elevation A ignitor start command pulse 158 and no ignitor trip command 160 which is the output of inverter 162, the input of which is ignitor trip command 164. The output of AND gate 154 also generates an ignitor start time pulse for each of the four ignitors on burner elevation A. The output of AND gate 154 passes through inverter 166 to provide an input to pulse generation circuit 168. The presence of a logic 1 at the output of inverter 166 is an ignitor start command that generates a logic 1 pulse 170 of pulse generation circuit 168 the duration of which is determined by the time setting on time delay 172. Ignitor start time 170 provides a signal to initiate the operation of each of the four ignitors associated with burner elevation A.

The alternate logic to set flip flop 146 is derived from the operating status of pulverizing coal mill 24 in burner elevation A at the time the switching is complete. The successful initiation of the four ignitors associated with burner elevation A was retained in the memory of process control computer 86. That information is reconstructed below broken line 152 by processing whether or not three out of four ignitors associated with burner elevation A are proven in operation. Three out of four circuit 174 processes four ignitor proven signals 176, 178, 180 and 182, one for each of the four ignitors associated with burner elevation A and produces as its output 176 a logic 1 signal when any three of the four ignitors are proven in operation. Signal 176 is the input to pulse generation circuit 178 which produces a logic 1 pulse output 180, the duration of which is determined by the time delay of time delay 182. Output 180 emulates the pushing of a push button and is effective to set flip flop 146 when input 184 of end gate 186 indicates there is no ignitor trip signal. The no ignitor trip signal 184 the output of inverter 188 the input 190 of inverter 188 is the output of OR gate 192, signal 190 indicates an ignitor trip condition exists and resets flip flop 146 generating an ignitor trip signal 194 at the output of AND gate 148 anytime time delay 144 has timed out. Ignitor trip signal 190 can be generated from many signals, a few representative signals are shown; including ignitor trip demand 164, stop push button depressed 196, automatic stop ignitor signal 198 and main fuel trip 200.

Thus, at the moment of switching inputs and outputs 130 from process control computer 86 to process control computer 96 AND gate 148 in conjunction with time delay 144 prevents an ignitor trip from occurring by providing a time delay during which the operating status of the subprocess is evaluated and flip flop 146 set to prevent a trip condition where appropriate. This provides an on-line maintenance capability without disconnecting power or powering down the subprocess. Control of a subprocess can be switched to a process control computer remaining on-line and already operating. The process control computer assuming control of the subprocess previously controlled by the now failed or otherwise out of service processor assumes control by a bumpless transfer.

In an alternate embodiment shown in FIG. 10, process control computers 86 through 104 are each interfaced to data highway 210 by modems. Process control computer 86 is interfaced to data highway 210 through modem 212. Process control computer 88 is interfaced to data highway 210 through modem 214. Process control computer 90 is interfaced to data highway 210 through modem 216. Process control computer 92 is interfaced to data highway 210 through modem 218. Process control computer 94 is interfaced to data highway 210 through modem 220. Process control computer 96 is interfaced to data highway 210 through modem 222. Process control computer 98 is interfaced to data highway 210 through modem 224. Process control computer 100 is interfaced to data highway 210 through modem 226. Process control computer 102 is interfaced to data highway 210 through modem 228. Process control computer 104 is interfaced to data highway 210 through modem 230.

In the previous embodiment, each process control computer 86 through 100 had a dedicated link between the input and output and the particular process control computer providing the control function therefor. In the present embodiment of the invention, a process control computer performing the unit control function, such as process control computer 102, would identify which process control computer 86 through 100 would control the input and output of each subprocess by identifying the process control computer to which each input and output modem communicates input control signals as well as identify each input and output modem to which each process control computer communicates output control signals.

The field input and output connections are also interfaced to data highway 210 by modems. Field input and output 232 is interfaced to data highway 210 by modem 234. Field input and output 236 is interfaced to data highway 210 through modem 238. Field input and output 240 is interfaced to data highway 210 through modem 242. Field input and output 244 is interfaced to data highway 210 through modem 246. Field input and output 248 is interfaced to data highway 210 through modem 250. Field input and output 252 is interfaced to data highway 210 through modem 254. Field input and output 256 is interfaced to data highway 210 through modem 258. Field input and output 260 is interfaced to data highway 210 through modem 262.

In the preferred embodiment, field input and output 232 is controlled by process control computer 94. Field input and output 232 represents a subprocess controlled by process control computer 94 such that modem 234 communicates with modem 220 over data highway 210 input control signals from field input and output 232. Process control computer 94 receives the input signals and in accordance with a preprogrammed set of instructions generates in response to the input signals and in accordance with the preprogrammed instructions control signals outputted through modem 220 which in turn communicates over data highway 210 to modem 234. Similarly, process control computer 92 receives input signals from field inputs and outputs 236 through modem 238 as communicated over data highway 210 to modem 218. Field inputs and outputs 236 receive control signals from process control computer 92 as communicated from modem 218 over data highway 210 to modem 238. Similarly, process control computer 90 receives input signals from field inputs and outputs 240 through modem 242 as communicated over data highway 210 to modem 216. Field inputs and outputs 240 receive control signals from process control computer 90 as communicated from modem 216 over data highway 210 to modem 242. Similarly, process control computer 88 receives input signals from field inputs and outputs 244 through modem 246 as communicated over data highway 210 to modem 214. Field inputs and outputs 244 receive control signals from process control computer 88 as communicated from modem 214 over data highway 210 to modem 246. Similarly, process control computer 86 receives input signals from field inputs and outputs 248 through modem 250 as communicated over data highway 210 to modem 212. Field inputs and outputs 248 receive control signals from process control computer 86 as communicated from modem 212 over data highway 210 to modem 250. Similarly, process control computer 100 receives input signals from field inputs and outputs 252 through modem 254 as communicated over data highway 210 to modem 226. Field inputs and outputs 252 receive control signals from process control computer 100 as communicated from modem 226 over data highway 210 to modem 254. Similarly, process control computer 98 receives input signals from field inputs and outputs 256 through modem 258 as communicated over data highway 210 to modem 224. Field inputs and outputs 256 receive control signals from process control computer 98 as communicated from modem 224 over data highway 210 to modem 258. Similarly, process control computer 96 receives input signals from field inputs and outputs 260 through modem 262 as communicated over data highway 210 to modem 222. Field inputs and outputs 260 receive control signals from process control computer 96 as communicated over data highway 210 to modem 262.

All communications between modems are in a specified protocol format. The protocol format is comprised of several fields including inter alia the address identifying the modem to which a given communication is sent over data highway 210, a function code, a data field and an error check. Contained in the address identifying the modem to which a given communication is sent is a number uniquely identifying each modem 212 through 226, 234, 238, 242, 246, 250, 254, 258 and 262. Only the addressed modem passes a communication with its identifying address on to the input and output or process control computer it serves. In this manner, upon failure or otherwise removal from service of a process control computer 86 through 100, control of the subprocess controlled by the failed or otherwise removed from service process control computer may be assumed by another of the process control computers that has been preprogrammed to assume control and that has not failed or otherwise been removed from service by having the process control computer performing the unit function, such as process control computer 102, changing the modem address of the process control computer that communicates with the input and output modem of the subprocess formerly controlled by the failed or otherwise removed from service process control computer. By way of example, process control computer 94 controls the subprocess represented by field inputs and outputs 232 in the above-described manner with modem 220 receiving input control signals of operational parameters of the subprocesses represented by input and output 232 and executes a preprogrammed set of instructions based upon the input signals generating in response thereto in accordance with the preprogrammed instructions control signals outputted through modem 220 to modem 234 to control the subprocesses represented by input and output 232. Hence, the protocol format of inputs from input and output 232 as communicated to data highway 210 by modem 234 includes in the unique identifying address a number representing modem 220, the modem serving process control computer 94. The output control signals generated by process control computer 94 are communicated to data highway 210 by modem 220 which includes in the identifying address of the protocol format a unique number identifying modem 234 as the recipient modem. In this manner, process control computer 94 controls the subprocesses represented by input and output 232. Should process control computer 94 fail or otherwise be removed from service, detection of removal from service as well as the priority of switching to another process control computer is accomplished as described above. By reassigning the modem address with which modem 234 communicates, control of the subprocesses represented by input and output 232 may be switched to another process control computer such as process control computer 86 which is preprogrammed to assume control of the subprocesses represented by input and output 232. By reassigning the modem address with which modem 234 communicates to be the address of modem 212, input signals communicated to data highway 210 by modem 234 relative to input and output 232 are received by process control computer 86. It is also necessary to assign the identifying address of modem 234 to the output of the formerly unused logic within process control computer 86 that is assuming the control function of the subprocesses represented by input and output 232. In this manner, subsequent to receiving input signals of operational parameters of the subprocesses represented by input and output 232 through modem 234, data highway 210 and modem 212, and updating the history dependent latches in the formerly unused control logic, process control computer 86 can execute a preprogrammed set of instructions based upon the inputs and generate in response thereto and in accordance with the preprogrammed set of instructions control signals outputted through modem 212 to data highway 210 and received by modem 234 to control the subprocesses represented by input and output 232.

Although the preferred embodiment of the alternate embodiment of the invention has been described with respect to a single modem such as modem 234 providing to data highway 210 all inputs necessary for a given process control computer to control an associated subprocess as well as monitor the operation of the associated subprocess from a safety perspective and to monitor the operation of a second subprocess from a safety perspective as well as provide the corresponding outputs from a process control computer to the respective input and output 232, it is not limited thereto. Each modem interfacing between inputs and outputs and data highway 210 could serve a separate subprocess such that a first modem could provide to a process control computer the input signals of operational parameter of the associated first subprocess as well as the input signals commensurate with the operational safety of the associated first subprocess and of course provide the corresponding output control signals to the respective input and output. In order to provide a redundant backup of the operational safety of another subprocess, a process control computer could receive input signals of operational parameters commensurate with the operational safety of a second subprocess through the second modem.

I claim:

1. In a distributed control system of the type having a plurality of process control computers corresponding in number to the number of subporcesses controlled by the distributed control system, a method of controlling a plurality of subprocesses upon the failure of a process control computer controlling one of the subprocesses, the method comprising the steps of:

(a) each process control computer in the distributed control system receiving input signals of operational parameters of an associated first subprocess of the distributed control system;

(b) each process control computer in the distributed control system executing a preprogrammed set of instructions based upon the input signals;

(c) each process control computer generating in response to the input signals and in accordance with the preprogrammed instructions, control signals to control the first subprocess;

(d) each process control computer in the distributed control system receiving input signals commensurate with the operational safety of the associated first subprocess;

(e) each process control computer in the distributed control system executing a preprogrammed set of instructions based upon the operational safety of the associated first subprocess input signals;

(f) each process control computer generating in response to the input signals commensurate with the operational safety of the associated first subprocess and in accordance with the preprogrammed instructions, control signals for shutting down the associated first subprocess when an unsafe operating condition is approached;

(g) each process control computer in the distributed control system receiving input signals of operational parameters commensurate with the operational safety of a second subprocess of the distributed control system;

(h) each process control computer in the distributed control system executing a preprogrammed set of instructions based upon the operational safety of the second subprocess input signals;

(i) each process control computer in the distributed control system generating in response to the input signals commensurate with the operational safety of the second subprocess and in accordance with the preprogrammed instructions, control signals for shutting down the second subprocess when an unsafe operating condition is approached;

(j) each process control computer in the distributed control system executing a spare preprogrammed set of instructions to control a third subprocess;

(k) each process control computer in the distributed control system executing a spare preprogrammed set of instructions for shutting down the third subprocess when an unsafe operating condition is approached;

(l) each process control computer in the distributed control system executing a spare preprogrammed set of instructions for shutting down a fourth subprocess when an unsafe operation condition is approached;

(m) each process control computer in the distributed control system receiving input signals for the spare preprogrammed instructions of steps (j)-(l) from input ports with no inputs attached thereto;

(n) each process control computer in the distributed control system generating in response to the input signals for the spare preprogrammed instructions and in accordance with the spare preprogrammed instructions control signals for controlling the third subprocess;

(o) each process control computer in the distributed control system generating in response to the input signals for the spare preprogrammed instructions and in accordance with the spare preprogrammed instructions control signals for shutting down the third subprocess when an unsafe operating condition is approached;

(p) each process control computer in the distributed control system generating in response to the input signals for the spare preprogrammed instructions and in accordance with the spare preprogrammed instructions control signals for shutting down the fourth subprocess when an unsafe operating condition is approached;

(q) detecting the removal from service of one of the process control computers of the distributed control system controlling a subprocess;

(r) upon detecting the removal from service of one of the process control computers switching the input and output connections from the process control computer removed from service to another process control computer of the distributed control system that has not been removed from service; and (s) controlling the subprocess formerly controlled by the process control computer removed from service with the process control computer to which the input and output connections are switched.

2. The method of controlling a plurality of subprocesses upon failure of a process control computer as recited in claim 1 wherein the input and output connection switching is achieved automatically.

3. The method of controlling a plurality of subprocesses upon the failure of a process control computer as recited in claim 2 wherein the automatic switching is accomplished in a predetermined sequence.

4. The method of controlling a plurality of subprocesses upon the removal from service of a process control computer as recited in claim 2 comprising: reconstructing the status of memory locations in control circuits of the process control computer assuming control after the input and output connections are switched and prior to controlling the subprocess so as to properly reflect the operating status of the subprocess whose input and output connections are switched, whereby a bumpless transfer is achieved in that one bit memory devices in the control circuits of the process control computer assuming control are set to the state of the corresponding one bit memory devices in the control circuits of the failed process control computer prior to the process control computer assuming control performing any control function dependent upon the state of a memory device.

* * * * *